INVENTOR.
ROY W. JONES

BY *Chas. W. Candy*

ATTORNEY

May 23, 1950 R. W. JONES 2,508,644

TELEPHONE CALL INTERCEPTING SYSTEM

Filed June 6, 1945 4 Sheets-Sheet 2

INVENTOR.
ROY W. JONES

BY Chas. W. Candy

ATTORNEY

TELEPHONE CALL INTERCEPTING SYSTEM

Filed June 6, 1945 4 Sheets-Sheet 3

INVENTOR.
ROY W. JONES

BY
Chas. W. Cardy
ATTORNEY

May 23, 1950 R. W. JONES 2,508,644

TELEPHONE CALL INTERCEPTING SYSTEM

Filed June 6, 1945 4 Sheets-Sheet 4

INVENTOR.
ROY W. JONES

BY Chas. W. Candy

ATTORNEY

Patented May 23, 1950

2,508,644

UNITED STATES PATENT OFFICE 2,508,644

TELEPHONE CALL INTERCEPTING SYSTEM

Roy W. Jones, Chicago, Ill., assignor to Automatic Electric Laboratories, Inc., Chicago, Ill., a corporation of Delaware Application June 6, 1945, Serial No. 597,778

25 Claims. (Cl. 179—17)

Figure 1:
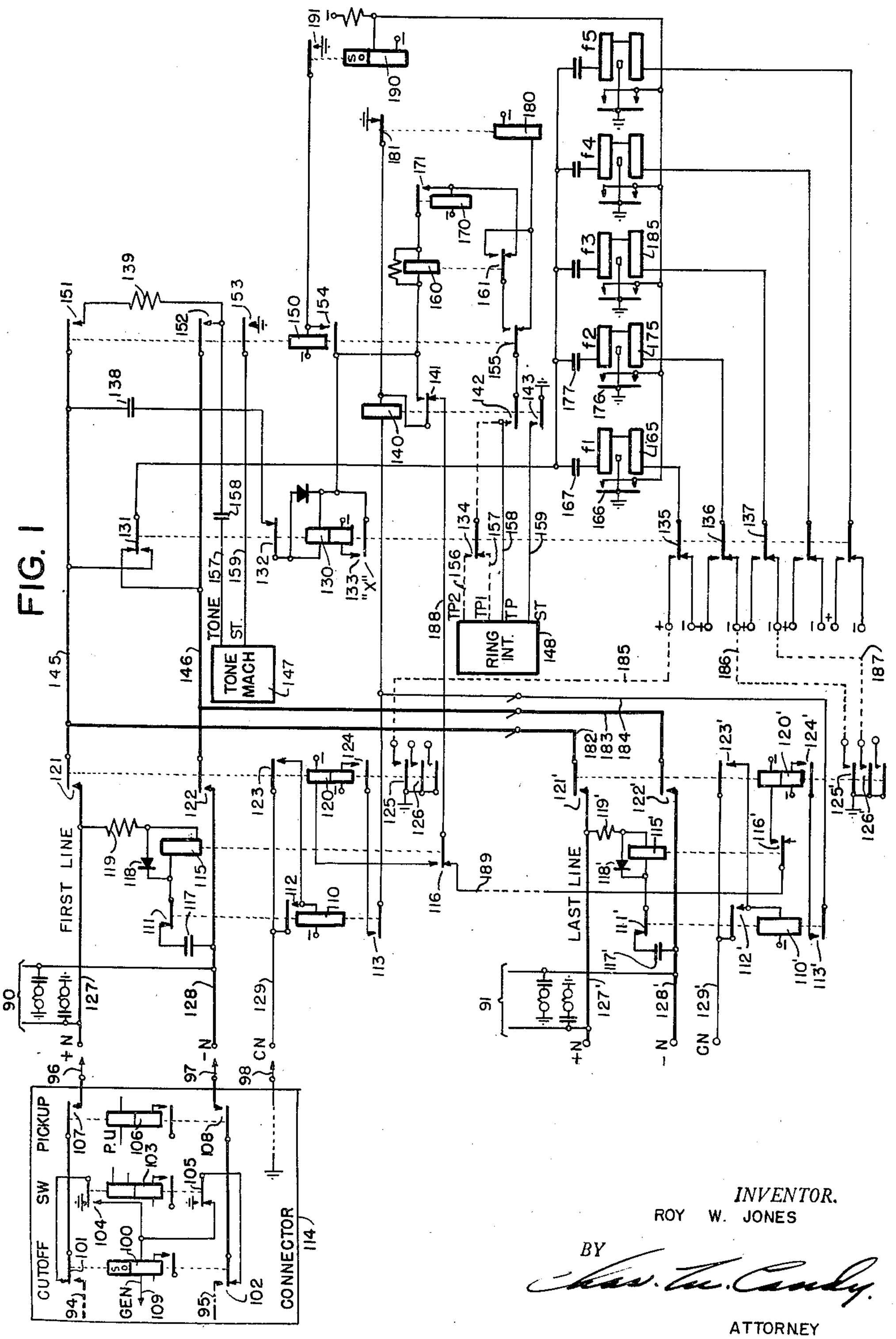

The present invention relates in general to telephone systems, and more particularly, to improvements in call intercepting apparatus to be used in automatic telephone exchanges, for intercepting calls to certain stations in the party lines of the system.

In telephone systems of the character indicated, when one or more of the subscriber stations on a party line have been taken out of service or disconnected from the line, it is desirable, on calls made to such stations, that the calling party be advised in some manner that the called station cannot be reached, in order to reduce wasted calls and avoid tying up switching equipment needlessly.

Various systems have been devised to accomplish this purpose by transferring the call to an operator, but most of these systems have limitations of various kinds, such as high cost, marginal operation, or the use of special ringing systems or switching equipment. Others are limited to 4 or 5-party lines, or are limited as to the number of stations for which calls can be intercepted on any given line. The present system has none of these limitations, nor does it require the services of an operator.

It is an object therefore of the present invention to provide improved apparatus for party-line call interception of the type which functions by giving a momentary signal of a distinctive character to the calling party on calls intercepted, as constructive notice that service to the station wanted has been discontinued.

It is another object of my invention to provide improved apparatus of the character described, which is low in cost, reliable in operation, and so flexible in its application that it will function equally well with almost any type of standard automatic telephone equipment and standard methods of ringing, and with either bridged or divided-ringing party lines. Two separate embodiments of the invention are provided, one for use with harmonic-ringing party lines, and one for use with code-ringing party lines. Either will intercept calls to any predetermined station on the line, or to any number of stations on a line up to the maximum of ten or twenty as the case may be, easily and expeditiously, and without delays or confusion. Upon interception, the ringing signals are cut off without registering the call, and the intercept signal is connected to the calling line. Then, after a short interval, if the calling party has not already released it, the intercept equipment releases itself automatically.

One feature of my invention, which is chiefly responsible for reducing the cost, is the concentration of the bulk of the intercept equipment in a single circuit common to a plurality of party lines requiring intercept service, with a minimum of equipment individual to each party line. For convenience, the common equipment will be called the intercept trunk, and the individual equipment, the intercept line circuit.

Another feature of the invention lies in the use of a novel three-relay intercept line circuit. This circuit, which is individual to each line requiring interception, consists of a single alternating-current line relay connected in bridge of the line, and two direct-current relays. The line relay is universal in the sense that it operates on all signals on either side of the line, and regardless of whether bridged or divided ringing is employed. In most circuits of this type two line relays are required if calls are to be intercepted on both sides of the same line. This line relay is also arranged to be disconnected from the line immediately after it has operated to cause seizure of the common equipment, in order to permit the full strength of the ringing signal to reach the intercept trunk. It is also arranged to be kept disconnected in this manner for the balance of the call, or until the calling party has hung up, in order to prevent re-seizure of the trunk by the same call in the case of automatic release following a non-intercepted call. Otherwise, if the called party had not yet answered and ringing signals were still going out over the line, the common equipment might be repeatedly seized by the same call, thus reducing the call handling capacity of the common equipment, by causing it to function needlessly.

Another feature of the invention, which gives it much of its flexibility in application, is its reliance on the ringing current actually impressed on the line, the complete characteristics of which are automatically analysed by the common equipment, with no other control except the normal timing pulses from the ringing equipment which mark the beginning and end of each ringing period or cycle. The decision as to whether or not interception occurs, depends fully, in both the code and harmonic circuits, on what manner of ringing signal is actually placed on the line, thus requiring nothing in the way of special features in the regular automatic switching equipment. Both circuits employ the same ringing-controlled line circuit for seizing the intercept trunk, and in addition, utilize ringing controlled devices in the intercept trunk to fix the side of the line being rung, and to cause interception.

A further feature of the invention is the utilization of an an end-of-cycle pulse from the ringing interrupter for the automatic release. This provides a very convenient and uniform timing interval with minimum requirements as to equipment and maintenance.

Still another feature is a provision for automatic release in cases where the intercept trunk has been seized inadvertently or otherwise and ringing does not follow. This prevents tying up the intercept equipment in cases of partial operation of the intercept trunk, for any reason.

Still another feature is the simple method used for marking calls for interception, by means of cross connections to ground at the various line circuits.

Figure 2:
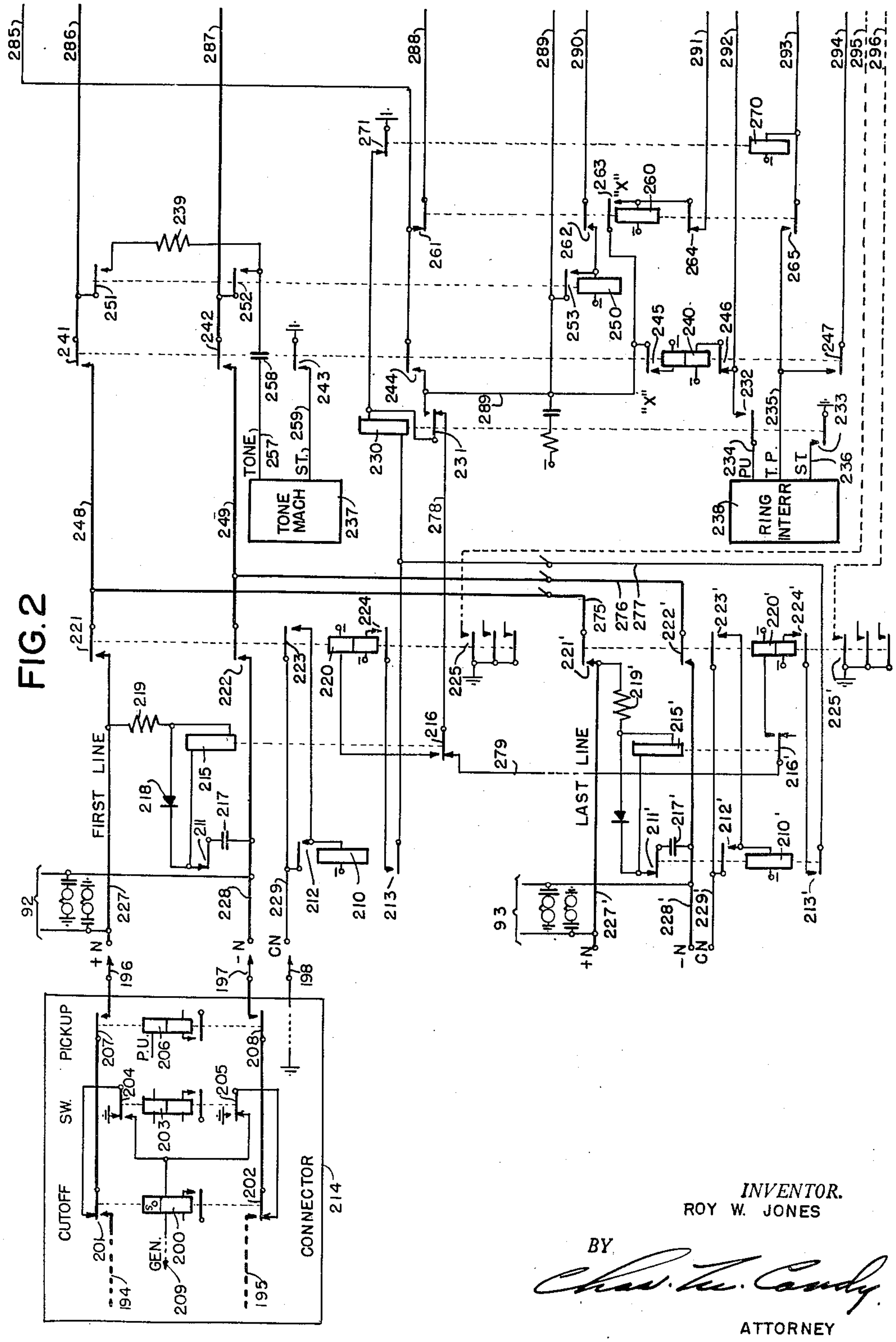
Figure 3:
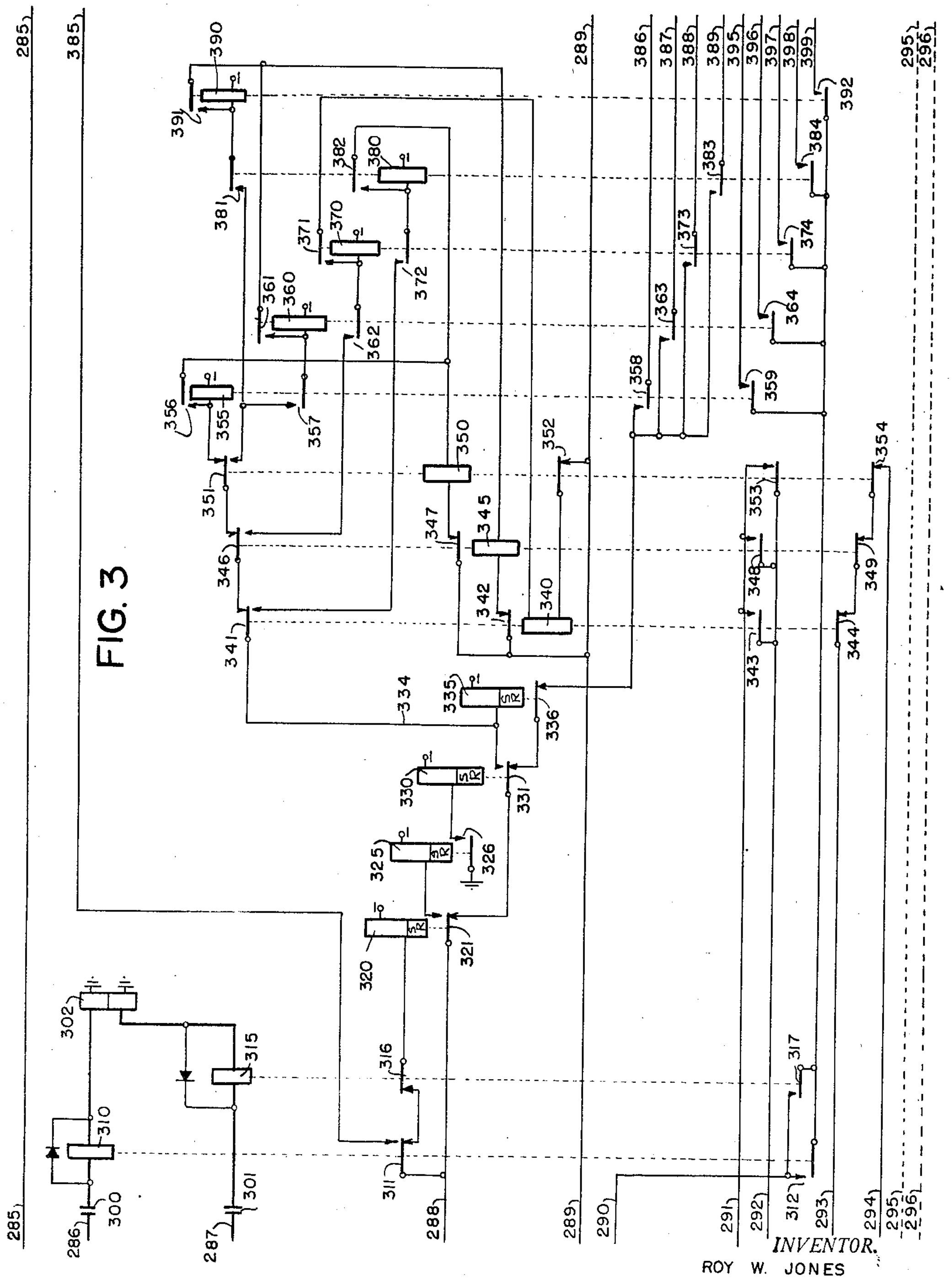
Figure 4:
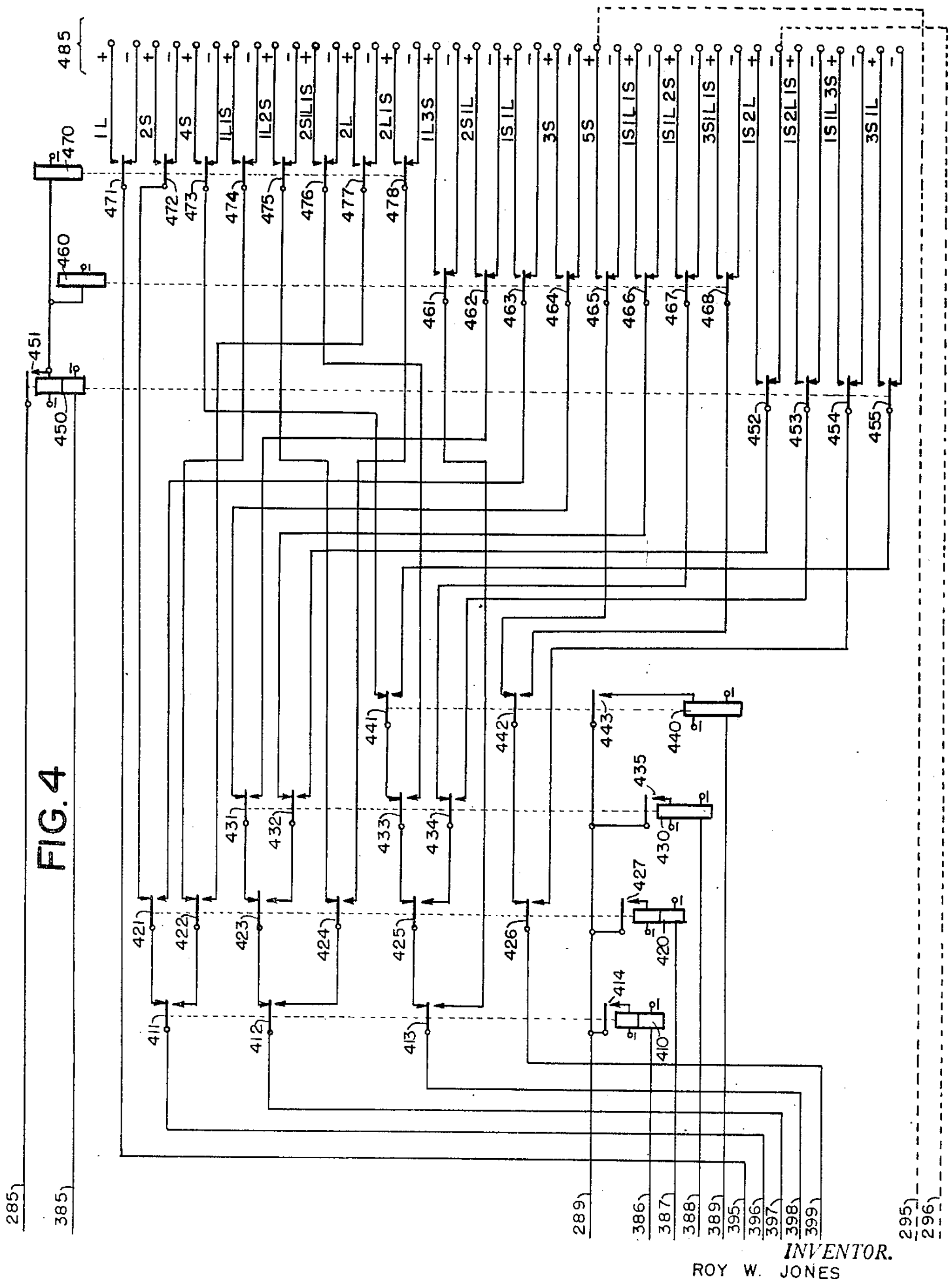

Other objects and features of the invention will be apparent from the specification and claims which follow, with due reference to the attached drawings comprising Figs. 1 to 4 which are also a part of the specification, Fig. 1 being the harmonic system and Figs. 2, 3 and 4 the code system.

With reference to the drawings, Figure 1 represents the circuit employed with harmonic ringing party lines, one of which is shown symbolically at 90 on the upper left of the sheet. The intercept line circuit assumed to be associated with this party line for the purpose of this explanation is shown on its immediate right, consisting of relays 110, 115 and 120, together with conductors 127, 128 and 129, while on the right half of the drawing is the common equipment or intercept trunk, consisting of twelve relays and two trunk conductors.

One intercept line circuit as indicated, is connected to each party line requiring intercept service. In most cases a definite number of these line circuits would be provided, according to the average requirements of the system, with facilities for connecting to the various party lines as needed. In the drawing, a second line circuit is shown below the first, in order to show the manner in which the different line circuits are associated together and with the common equipment, so as to permit any line to seize the common equipment and yet prevent more than one line having access to the common equipment at a time. In operation, the line relay 115 responds to the ringing current on all calls to the associated party line and attempts to operate relays 110 and 120. If the common equipment is idle, these relays do operate, and seize the intercept trunk. Relay 110 which is termed the hold relay, thereupon disconnects the line relay from the line and keeps it disconnected for the balance of the call.

Relay 120 which is termed the connect relay, serves, as its name indicates, to connect the call to the intercept trunk. This relay also acts as a marking relay to indicate to the intercept trunk by a simple groud connection, which calls to the associated party line should be intercepted. This relay can be provided with as many springs as necessary to handle the largest number of stations likely to require call interception on any given line. Thus with a full complement of springs, relay 120 can mark for interception, calls to as many as eight stations on a single harmonic ringing party line, out of a possible maximum of ten. Through the use of a multi-contact relay, or through the use of a slave relay subordinate to and directly operated by relay 120, calls to all ten stations could be intercepted just as readily, merely by making the required ten cross-connections between the marking relay and the common equipment. In practice, these cross connections would be facilitated by the use of suitable terminal blocks. Only three pairs of marking springs, such as 125, are shown on the connect relays on the drawings, since this is a sufficient number to illustrate the principle involved.

The intercept trunk, shown on the right of the line circuit, is as stated, common to a plurality of party lines. The exact number of such lines that can be served by one such trunk depends on the total number of incoming calls to these lines during the busiest period. That the number would be considerable will be apparent from the fact that a non-intercepted call is connected to the intercept trunk for the length of only one ringing cycle or five seconds, while an intercepted call is connected to the intercept trunk for a maximum of two ringing cycles, or ten seconds. The maximum theoretical call handling capacity of such a trunk, assuming two calls intercepted out of every ten, and no delays between calls, would therefore be in the neighborhood of ten calls per minute.

The trunk equipment proper consists of the trunk conductors 145 and 146 and relays 130 to 190 as indicated. Relay 130 is a test relay and is normally connected to the positive trunk conductor. This relay will respond to ringing signals of any of the usual ringing frequencies, and its operation or non-operation determines the side of the line being rung. Relay 140 is a lockout relay which operates from the line circuit and helps prevent more than one call being connected to the trunk at a time. Relays 150 and 190 are intercept relays whose operation causes a call to be intercepted, while relays 160, 170 and 180 are release timing relays whose successive operation, under the control of the interrupter, brings about the automatic release. Below these relays is shown a group of five frequency responsive relays commonly known as traffic ringers, which are the means employed to test the frequency of the signal being impressed on the line.

These traffic ringers, the first three of which have been designated 165, 175, 185 as shown, are little more than the movement of a tuned harmonic ringer with the gongs removed and contact springs added, so that as the weighted armature moves from side to side, it closes these contacts momentarily. One such movement is provided for each frequency, and of course each will respond to its own particular frequency but not to any of the others. Basically, the use of such devices for intercepting service is old in the art, as may be seen by reference to Patent No. 1,463,271, granted to T. G. Martin, July 31, 1923.

In the present instance, the windings of these traffic ringers are all multipled together on one side and wired to the armature contact of break-make springs 131, which automatically connect them to the proper side of the line, according to the action of test relay 130 in response to the ringing current. The other side of each winding is taken separately to the armature contact of other break-make springs on relay 130, such as springs 135, 136 and 137. One or more of these traffic ringers may therefore be in circuit on a call to any given party line, depending on the ground markings connected to the other side of these springs from the intercept line circuit associated with that line. And if the ringing signal is on the proper side of the line, and of the proper frequency to cause the operation of one of the traffic ringers so placed in circuit, the call is intercepted.

The rectangles 147 and 148 in the intercept trunk represent the tone machine and ringing interrupter respectively. These are not a part of the intercept trunk but rather a part of the regular exchange equipment, and may be of any standard type. The only requirement for the tone machine, as far as the intercept circuit is concerned, is that it furnish a distinctive tone for the intercept signal when required.

The interrupter, as its name indicates, serves to interrupt the ringing current supplied by the ringing generators and feed it to the automatic switching apparatus at the proper time. In addition, this interrupter furnishes the usual end-of-cycle time pulse to conductor 156, 157 or 158 for the previously mentioned automatic release. Conductors 156 and 157 are alternative time-pulse conductors required when separate one and two-ring interrupters are used.

As is well known, harmonic ringing for party lines makes use of five different frequencies for signalling. By this means, up to five stations in bridge of the line may be signalled independently, without disturbing any station but the one called. Also, by ringing with each frequency on different sides of the line, and connecting the station ringers between one or the other side of the line and ground, ten stations may be signalled by means of these five frequencies without conflict. With this method, each recurrent ringing cycle consists usually of a one-second ring followed by a four-second silent interval, for a total cycle time of five seconds. In this case only one interrupter is employed, and the time pulse lead therefrom would be connected to conductor 158.

Another method of harmonic signalling on ten-station party lines commonly employed where the use of grounded lines is not desirable, consists in connecting the ringers in bridge of the line and using a one or two-ring code with each frequency. Thus two stations are signalled on each call, but each station answers only its own code, as in code ringing. In one-ring signals the generator is applied to one side of the line, and on two-ring signals it is applied to the other side of the line, as a matter of convenience and custom. The one-ring signal uses the regular one-and-four-second timing cycle discussed in the preceding paragraph, while the two-ring signal normally consists of two one-second ringing pulses with a half-second interval between, and a two-and-one-half second silent interval following the second pulse, for a total cycle time again, of five seconds.

With this system, if a combination one and two-ring interrupter is used, the time pulse lead therefrom is connected as before to conductor 158. If however, separate one-ring and two-ring interrupters are employed, the time pulse lead from one interrupter will be connected to conductor 156 and the time pulse lead from the other interrupter will be connected to conductor 157, depending on the side of the line involved. In this case conductor 158 is not used, and conductors 156 and 157 are switched into the circuit as required by test relay 130, at its contact springs 134.

Since as stated, this intercepting equipment was designed to operate with various types of standard automatic telephone systems, and in particular with Strowger step-by-step systems and with all relay systems, and since the mechanics and operation of such systems are well known in the art, they will not be discussed here except in a very general way.

The rectangle 114 for example, at the extreme left of Figure 1, represents a connector in such a system, which is the end switching means which actually connects the call to the called line in response to the final digits of the called line number, as dialed by the calling party. In the Strowger system, this would be accomplished by means of stepping magnets, wipers and banks, whereas in an all-relay system it would be done by means of multi-contact or gang relays. The end result is the same in either case. This is, essentially, to seize the called line, make it busy to other calls, impress suitable ringing signals thereon to signal the wanted station, complete the connection when the called station answers, and release the call when required.

The relays 100, 103 and 106 shown in the connector 114 represent the essential relays required for applying the ringing current to the line. They are shown only to facilitate the explanation, and other arrangements would serve equally well. The ringing frequency to be applied to the line on any given call is determined usually by the last digit of the number dialed, which operates a small auxiliary stepping switch or a group of counting relays in the connector, to connect generator current of the proper frequency to the ring-cut-off relay 100 by way of conductor 109. This same digit, depending on whether it is even or odd, also causes the operation of switching relay 103 if the ringing is to take place on the upper or positive side of the line as shown. For ringing on the lower side of the line, relay 103 remains normal.

The ringing interrupter, in addition to furnishing the time pulse previously mentioned, which occurs at the start of the comparatively long silent period marking the end of each ringing cycle, also furnishes what is commonly known as a pick-up pulse, which occurs at the end of the same silent period, to mark the start of the next ringing cycle. Following the operation of the switching relay 103 in the connector, the next pick-up pulse causes the operation of the pick-up relay 106, whereupon the ringing current passes out onto the line, in accordance with the ringing pulses.

Figures 2, 3 and 4, when laid side by side in the order stated, with the connecting lines abutting, represent the circuit employed with code ringing party lines, one of which is shown symbolically at 92 in Figure 2. The partial connector circuit and the intercept line circuits also shown at the left of Figure 2, are identical with those illustrated in Figure 1. The intercept trunk circuit includes all of the equipment to the right of the line equipment with the exception of the tone and interrupter machines, and consists of twenty six relays and sundry associated items as shown in the three figures.

With respect to Figure 2, relay 200 is the connect- or ring-cut-off relay previously described, relay 203 is the switching relay which determines which side of the line to be rung, and relay 206 is the connector pick-up relay which completes the ringing circuit, and passes the ringing signals to the line after the completion of dialing. Relays 210, 215 and 220 likewise comprise the intercept line circuit, relay 215 being the line relay which responds to the ringing current to operate the hold and connect relays 210 and 220, which in turn disconnect the line relay and connect the call to the intercept trunk. In the intercept trunk, relay 230 is the lockout relay which is operated from the line circuit to start the seizure of the trunk, and relay 240 is another pick-up relay which is operated from the interrupter at the proper time to complete the seizure. Relay 250 is the intercept relay, which operates on all intercepted calls to signal the calling party; relay 260 is still another pickup relay, which is also operated by the interrupter at the proper moment to prepare the operate circuit to the intercept relay; and relay 270 is the release relay which brings about the automatic release.

As in Figure 1, the tone machine and ringing interrupter, indicated in Figure 2 by the rectangles 237 and 238 respectively, are not a part of the intercept trunk, but are a part of the regular exchange apparatus. Their form is not important for the purpose of the invention, and they may utilize relays or a rotating machine with cams, or any standard construction. The only requirement for the tone machine here again is merely that it furnish a distinctive tone for the intercept signal when required. The interrupter, in addition to its usual function of interrupting the current from the ringing generator and passing it to the automatic switching apparatus as needed, is also required to furnish the same pick-up pulse and time pulse marking the start and end respectively of a code cycle, as described in connection with Figure 1.

Code ringing is employed chiefly on country lines when more than ten stations are connected or are likely to be connected to some of the lines of the system. Ringing current of a single frequency is used, and the code signals consist of various combinations of long and short rings repeated intermittently until the called station answers. Half of the stations are connected between one side of the line and ground and half between the other side of the line and ground. The bells of half the stations will therefore ring on all signals, but each station answers only its own code, or should do so. The practical limitation of such a system is twenty stations to a line, and this is the present maximum.

The ringing code to be sent out over the line, regardless of whether step-by-step or all-relay switching is involved, is determined as in the harmonic system, by the final digit or digits of the number dialed by the calling party, which operate an auxiliary switch or some counting relays in the connector 214 to select the code. These digits also determine the operation or non-operation of the connector switching relay 203 which fixes the side of the line to be rung.

The ringing interrupter 238, with the aid of the code selecting device and a ringing relay in the connector 214, interrupts the ringing current from the ringing generator and breaks it up into the different codes which are then passed on to the conductor 209 at the proper time as required. In the present case, each code signal cycle consists of from one to five pulses of ringing current separated by three-quarter-second intervals, and followed by a one-and-a-half-second silent period at the end of the code. The length of the short rings is about three-quarters of a second or less, and that of the long rings about two-and-a-quarter seconds, while the total length of each code cycle is from eight to ten seconds. No more than two long rings are provided in any code and these long rings may be any two of the first four rings of a code. This is a standard code widely used, and is the code for which the intercept circuit of Figures 2, 3 and 4 was designed. The circuit is by no means limited to this code however, since by the addition of a few counting relays it can be adapted to almost any code, such for example, as the special code employed in my prior Patent 2,285,282 on this same subject, issued June 2, 1942.

The only other function of the interrupter with respect to the intercept circuit, is to connect the pick-up pulse to conductor 234 of Figure 2 at the start of each ringing cycle just before the first code pulse is placed on the line, and to connect the end-of-cycle time pulse to conductor 235 at the end of each ringing cycle, immediately following the last code pulse. Both the interrupter and the tone machine are ordinarily at rest when no calls are passing through the exchange, but are caused to start each time a call is initiated, and remain in operation until the call is released.

With respect to Figure 3, relays 310 and 315 are ringing responsive trunk line relays, which are operated by the ringing signals on the line after seizure of the trunk. These relays have two functions, one being to determine the side of the line being rung, and the other being to aid in counting the pulses of the ringing code by repeating these pulses to the counting relays as direct current pulses. Relays 320 to 335 inclusive, are transfer relays, which aid in passing the direct current pulses from the line relays to the counting relays, the main group of which is shown in Figure 3 comprising relays 340 to 390 inclusive. These relays count the total number of rings in the code.

In Figure 4, relays 450, 460 and 470 compose a group of test relays which operate from line relay 310 when the ringing is on the positive side of the line, and remain normal when the ringing is on the negative side of the line. The position of these three relays, which operate in unison, fixes the side of the line being rung, as is obvious from the circuit which shows forty terminals representing the twenty possible codes, connected to make and break springs on these relays. To cause interception of calls to any station on a line, it is only necessary to connect marking ground from the intercept line circuit associated with this line, to that terminal representing both the code and the side of the line employed for signalling this station. Then whenever this signal appears, the counting and test relays in response thereto, will complete a circuit from this marking ground to the intercept relay 250, which then operates and intercepts the call.

The rectifier discs or unidirectional current-conducting devices, such as 118 and 218, shown connected across the winding of the line relays and certain of the other ringing responsive relays in both the harmonic and code circuits, have two functions. First, these rectifiers, by shunting one half of the alternating current wave around the relay, permit the use of direct current relays, which are more sensitive to the reduced ringing voltages often found on heavily loaded lines, than alternating current relays, and at the same time are less sensitive to dial pulses, on outgoing calls. Also, by so connecting these rectifiers that the positive side of the rectifier is always towards the positive side of the line, the tendency to chatter during dialing is still further reduced, due to the heaviest dial transients being shunted around the relay in all cases. When the dial springs open, a voltage is induced in the line which tends to maintain the current flow, and sets up a momentary or transient current in the same direction. The rectifier discs are conducting for this transient, and cause it to be shunted around the relay. When the dial springs close, a transient in the opposite direction occurs, due to the discharge of the condenser in series with each relay. This transient passes through the relay, but being due to the condenser action only, is too small to affect the relay. The energy of the first transient, on the contrary, is the sum of the energy stored in the capacitor due to the exchange voltage, plus the energy stored in the magnetic field.

The apparatus and the general method of operation having been described, a detailed description of the circuit operation will now be given, in order to facilitate a complete understanding of the invention in all its aspects.

*Call interception-harmonic ringing*

In considering the operation of Figure 1, it should first be noted that the upper intercept line circuit associated with party line 90 is arranged to intercept calls to one of the stations on this line, as indicated by the cross-connecting or marking conductor 185, and that the lower line circuit associated with line 91 is arranged to cause interception of calls to two stations on this line, as indicated by the cross connections 186 and 187. It may also be assumed, for the purpose of the explanation, that the first station is signalled with frequency #1 on the upper or positive side of the line, and that the other two stations are signalled with frequencies #2 and #3 respectively, on the lower or negative side of the line. It may also be assumed that traffic ringer 165 is tuned to respond to frequency #1, and traffic ringers 175 and 185 to frequencies #2 and #3 respectively.

When a call is made to line 90, the ringing-interrupter and tone equipments are started automatically, if not already in operation, and the connector 114 in response to the final dial pulses, connects the talking conductors 96 and 97 to the line conductors 127 and 128. At the same time, it connects ground battery through the hold conductor 98 to conductor 129.

If the call to line 90 is for the station marked for interception, which has presumably been disconnected from the line, the connector 114 will also, in response to the final digits of the number dialed, cause switching relay 103 to operate and lock, and will cause the connector frequency-selecting device to connect grounded ringing current of frequency #1 from the contacts of the ringing interrupter to conductor 109, and thence to the ring-cut-off relay. When now, at the start of the next ringing cycle, the interrupter grounds the pick-up lead, relay 106 operates from this ground and locks, and completes the ringing circuit.

Generator current of frequency #1 now passes out over the positive side of the line, and causes the operation of the intercept line relay 115 over the following circuit: ringing generator, ringing-interrupter contacts, frequency-selector contacts, conductor 109, winding of ring-cut-off relay 100, make contacts 104, break contacts 101, make springs 107, conductors 96 and 127, resistor 119, winding of line relay 115, break springs 111, capacitor 117, conductors 128 and 97, make springs 108, break contacts 102, and make contacts 105 to ground.

The operation of line relay 115 closes make contacts 116, and if the intercept trunk is idle, causes the operation of connect relay 120 over the following circuit: ground battery at break spring 181, break contacts 141, conductor 188, makes contacts 116, and the upper winding of relay 120 to negative battery. Relay 120 operating, at make springs 121 and 122 connects the line conductors 127 and 128 through to the trunk conductors 145 and 146, and at make springs 125 connects ground to marking conductor 185. Relay 120 also, at make springs 124, prepares its own locking circuit, and at make springs 123 completes a circuit to the hold relay 110 from connector holding ground, by way of the hold conductors 98 and 129.

The hold relay 110 now operates, and locks to the hold conductor independently of relay 120. Relay 110, at break springs 111 disconnects the line relay from the line, and at make springs 113 completes a locking circuit to the lower winding of relay 120, in series with lockout relay 140 in the intercept trunk. This circuit extends from ground through break springs 181, the winding of relay 140, make springs 113, make springs 124, and the lower winding of relay 120 to negative battery.

The lockout relay 140 now operates, and at break contacts 141 removes ground from the operate winding of relay 120 and from the operate circuit leading to the connect relays of the other line circuits. This prevents these relays from operating when the line relay 115 releases and re-establishes the chain circuit through the break contacts of the other line relays, by way of the dotted conductor 189. The other line relays may operate, but their connect relays cannot, until the trunk is again free. With this arrangement, only one line circuit at a time may seize the intercept trunk, and when this occurs, all the other line circuits are immediately locked out.

Relay 140 also, at make contacts 141, prepares a locking circuit for relays 130, 150, 160 and 170 from ground at break springs 181, and at make springs 142 connects the time pulse lead 158 to the release circuit. Finally, relay 140 at make springs 143, grounds the interrupter start lead 159 to prevent the interrupter from stopping until the intercept trunk has been released. This is done to insure that the automatic release feature will be available when needed.

The closing of make contacts 141 also completes a circuit for the ringing current through test relay 130. Since the line relay 115 is now disconnected from the line, the full strength of the ringing current available at the line terminals is available to relay 130, which operates from this same ringing current on the line conductor 127, by way of make contacts 121, trunk conductor 145, capacitor 138, break springs 132, upper winding of relay 130, make contacts 141, and thence to ground at break springs 181.

The test relay 130 upon operating, opens break contacts 132 to disconnect itself from the line, and at make contacts 133 completes a locking circuit for itself from ground through break springs 181, make contacts 141, make springs 133, and the lower winding of relay 130 to negative battery. At make contacts 131, relay 130 connects the traffic ringers to the positive side of the line via trunk conductor 145, and at make contacts 135 connects traffic ringer 165 to the marking conductor 185.

Relays 115 and 130 having disconnected themselves from the line, the full strength of the ringing current available at the line terminals is available to relay 165 which is tuned to the same frequency, or frequency #1. Relay 165 therefore operates from the ringing current on the line conductor 127, by way of make springs 121, trunk conductor 145, make contacts 131, capacitor 167, winding of relay 165, make contacts 135, marking conductor 185, and make springs 125 to ground.

Traffic ringer 165 upon operating, causes its armature to vibrate and close contacts 166 intermittently thereby completing an obvious circuit to relay 190 which operates over this circuit. Relay 190 in turn, at make springs 191, completes an obvious circuit for the intercept relay 150, which also operates.

The intercept relay 150 upon operating, locks to the ground at break springs 181 by way of make springs 154 and make contacts 141. Relay 150, at its make springs 153, connects ground to the tone start lead 159 to assure that the tone apparatus will be in operation when and as required, and at make contacts 155 connects the time pulse lead 158 to relay 170, by way of break contacts 161. At make springs 151 and 152 relay 150 connects the resistor 139 across the trunk conductors, and at make springs 152 it also connects the tone lead 157 to the trunk conductor 146, through the capacitor 158.

The shunt placed across the trunk conductors by the resistor 139 completes a direct current circuit for the ring-cut-off relay 100 as follows: negative battery at the ringing generator, interrupter contacts, frequency selector contacts, conductor 109, winding of relay 100, make contacts 104, break contacts 101, make springs 107, conductors 96 and 127, make springs 121, trunk conductor 145, make springs 151, resistor 139, make springs 152, trunk conductor 146, make springs 122, conductors 128 and 97, make springs 108, break contacts 102, and make contacts 105 to ground battery. Cut-off relay 100 operates over this circuit and locks. Relay 100, at break contacts 101 and 102 disconnects the ringing current from the called line, and at make contacts 101 and 102 connects the calling line through to the intercept trunk. Make contacts 102 at the same time connect the intercept tone through to the calling line loop where it is made audible in the receiver of the calling party's telephone, and warns him of the interception.

The foregoing action occurs during the first ringing cycle following seizure of the intercept trunk. Since each ringing signal is normally on the line for a period of about one second, and since the operate time of the various relays involved is measured in small fractions of a second, the first ringing signal is cut off in mid-ring, and the calling party thereupon immediately hears the intercept signal, as notice that the attempted call cannot be completed. The call is not registered, since resistor 139 is of too high a resistance to operate any back bridge or metering relays in the connector, while at the same time being sufficiently low in resistance to operate the ring-cut-off relay, as described.

At the end of the first ringing cycle, the ringing interrupter 148 puts a short pulse of ground on the time pulse lead 158, which passes through make springs 142, make springs 155, break contacts 161 and the winding of release timing relay 170 to negative battery. Release timing relay 170 operates, and at its make contacts 171 completes a circuit for release timing relay 160. Release timing relay 160 cannot operate at this time, due to being shunted by ground on both sides of its winding, but when the interrupter removes the ground from time pulse lead 158, relay 160 operates and locks in series with relay 170, over the following circuit: ground through break springs 181, make contacts 141, winding of relay 160, make springs 171 and the winding of relay 170 to negative battery.

The release timing relay 160 upon operating, connects the time pulse lead 158 to the release relay 180. On the next time pulse, therefore, at the end of the second ringing cycle, a circuit is completed to this relay by way of the time pulse lead and make contacts 142, 155 and 161. Relay 180 thereupon operates over this circuit and opens its break springs 181. This removes locking ground from the operated relays 120, 130, 140, 150, 160 and 170 and these relays therefore release and free the intercept trunk. The hold relay 110 remains locked to the connector hold lead, until the calling party hangs up.

If the calling party, upon hearing the intercept signal, hangs up immediately, the release of the connector switch will remove holding ground from the hold conductor 129 and unlock the hold relay 110, which also releases. The release of hold relay 110 opens make springs 113 and releases the connect and lockout relays 120 and 140. The lockout relay 140 upon releasing opens its make contacts 141, thereby removing the locking ground from relays 130, 150, 160 and 170 which likewise release. In this case the automatic release does not occur, since the release of relay 140 disconnects the time pulse lead at make springs 142.

In the case of a call to line 90 for a station not marked for interception, as for example a station signalled with frequency #2 on the positive side of the line, the operation will be quite similar to that already described, except that interception will not take place. Thus, when the ringing current is put on the line, relay 115 operates as before, and causes the operation of the hold, connect, and lockout relays 110, 120 and 140, thereby to seize the intercept trunk, and again ground the marking conductor 185. Test relay 130 now operates from the ringing current, locks as before to the ground at break springs 181 by way of make contacts 141, and connects the traffic ringers to the positive side of the line. A circuit is thereby again established through traffic ringer 165 to ground at make springs 125 on the connect relay, but since the ringing current is frequency #2 and relay 165 is tuned to fresuency #1, relay 165 does not operate. There is therefore no interception, and the call is completed in the usual way. At the end of the first ringing cycle, when the interrupter connects ground to the time pulse lead 158, this ground passes through make springs 142, break contacts 155, and the winding of release relay 180 to negative battery, and causes the operation of this relay. Release relay 180 thereupon opens its break contacts 181 and removes locking ground from relays 120, 130 and 140 which also release and free the trunk for other calls. Hold relay 110 however, remains locked to the connector, and remains so locked until the call has been terminated and the calling party has released. Line relay 115 therefore remains disconnected from the line for the balance of the call. Otherwise, if the called party had not yet answered when the trunk released, the ringing current on the line would again operate line relay 115, and permit re-seizure of the intercept trunk by the same call. It is thus seen that on a non-intercept call, the intercept trunk is held for only the length of one ringing cycle, or five seconds.

Assuming now a call to line 91, to the station signalled by ringing current of frequency #2 on the lower or negative side of the line, the action is again similar to that already described. In this case however, the switching relay 103 in the connector will not operate in response to the dialing, and the circuit for line relay 115', upon the operation of the pick-up relay 106, is as follows: generator current of frequency #2 through ring-cut-off relay 100, break contacts 105, break contacts 102, make springs 108, conductors 97 and 128', capacitor 117', break springs 111', winding of line relay 115', resistor 119', conductors 127' and 96, make springs 107, break contacts 101, and break contacts 104 to ground.

Line relay 115' operates over this circuit and causes the operation of connect relay 120' over the following circuit: ground through break springs 181, break contacts 141, conductor 188, break contacts 116, conductor 189 and break contacts of the other line relays, make springs 116', and the upper winding of relay 120' to negative battery. Relay 120' causes the operation of relay 110' which locks to the connector hold lead 129'. Relay 120' also, at its make springs 125' and 126' connects ground to the marking conductors 186 and 187, and at make contacts 121' and 122' connects the line through to the trunk conductors 145 and 146, by way of conductors 182 and 183 which are common to all of the intercept line circuits.

Upon the operation of the hold relay 110', a locking circuit is completed for the connect relay 120' in series with the lockout relay 140 as follows: ground through break springs 181, winding of relay 140, conductor 184 which is also common to all of the line circuits, make springs 113', make springs 124', and the lower winding of relay 120' to negative battery. Lockout relay 140 operates over this circuit and removes the operating ground from conductor 188 as before, to prevent operation of any other connect relays at this time.

Since, this time, the ringing current is impressed on the lower or negative side of the line, the test relay 130, which is connected to the positive side of the trunk, does not operate. The traffic ringers therefore remain connected to the negative side of the trunk. Both traffic ringers 175 and 135 will therefore be in circuit, since both are also connected to ground at make springs 125' and 126', by way of the marking conductors 186 and 187, and break contacts 136 and 137. And since relay 175 is tuned to frequency #2 while relay 185 is not, the ringing current on the trunk conductor 146, passing through break contacts 131, capacitor 177, winding of relay 175, break contacts 136, marking conductor 186 and make springs 125' to ground, causes the operation of relay 175.

The operation of relay 175 in turn, closes make springs 176 and causes the operation of the intercept relays 190 and 150. Relay 150 locks as before to ground at break springs 181, cuts off the ring, connects the intercept tone to the calling line, and, at make contacts 155, prepares the two-step automatic release circuit. At the end of the first ringing cycle, the time pulse from the interrupter on conductor 158 therefore operates relays 170 and 160 as before, through make contacts 142 and 155. Relay 170 operates on the appearance of the pulse, and relay 160 operates on its removal to switch the time pulse lead to the release relay 180, which operates on the next time pulse, at the end of the second ringing cycle, to release the trunk and the connect relay in the usual manner.

Should it occur by some chance, that the intercept trunk becomes seized in some way, as by a call or otherwise, and ringing on the line does not follow or is stopped after operating the line relay, due to a fault, or due to removal of the receiver by another party on the line involved, the release of the trunk takes place in the following way, it being assumed that trunk relay 140 has become locked up to a pair of hold and connect relays. The operation of lockout relay 140 of course, closes make springs 142 and 143, and the latter springs ground the interrupter start lead 159, thereby insuring the operation of this device. When now, the interrupter next grounds the time pulse lead, the release relay 180 is operated by this ground over a direct circuit passing by way of make contacts 142 and break contacts 155. Relay 180 upon operating, opens break springs 181, thereby releasing the held lockout and connect relays, and freeing the trunk. Otherwise, such a mischance might tie up the trunk for an indefinite period.

*Call interception—code ringing*

In considering the operation of Figures 2, 3, and 4, it will be noted that the upper intercept line circuit associated with party line 92, is arranged to intercept calls to one of the stations on this line whose code signal is five short rings on the positive side of the line, as indicated by the connections of the dotted marking conductor 295, and that the lower line circuit associated with party line 93, is arranged to intercept calls to a station on this line whose code signal is one short and two long rings on the negative side of the line, as indicated by the connection of the dotted marking conductor 296.

When a call is made to line 92, the ringing interrupter and tone equipments are started automatically upon the initiation of the call by circuits not shown, and connector 214, in response to the dial pulses, connects loop conductors 196 and 197 to the line conductors 227 and 228 respectively. At the same time, connector 214 also connects ground battery through the hold conductor 198 to conductor 229. If the call to line 92 is for the station marked for interception, the connector 214, in response to the final digits of the call number, will also cause the switching relay 203 to operate and lock, and at the same time will cause its own code selecting device to connect the proper coding contacts of the ringing interrupter to a ringing relay (not shown) which operates in accordance with the selected coding contacts to connect generator to conductor 209. When, at the start of the next ringing cycle following this action, the ringing interrupter energizes the pick-up lead, the pick-up relay 206 operates and locks, and puts ringing current out on the line each time the ringing relay is operated.

Ringing signals consisting of five short pulses of generator current now pass out over the positive side of the line, and cause the operation of the intercept line relay 215 over the following circuit: ringing generator, ringing relay contacts, conductor 209, winding of the ring-cut-off relay 200, make contacts 204, break contacts 201, make springs 207, conductors 196 and 227, resistor 219, winding of the line relay 215, break springs 211, capacitor 217, conductors 228 and 197, make springs 208, break contacts 202, and make contacts 205 to ground.

Line relay 215 operating, closes make contacts 216, and if the intercept trunk is not in use, causes the operation of connect relay 220 over the following circuit: ground through break springs 271, break contacts 231, conductor 278, make contacts 216, and the upper winding of relay 220 to negative battery. Relay 220, upon operating, connects the line conductors 227 and 228 through to the trunk conductors 248 and 249 at make contacts 221 and 222, and at make springs 225 connects ground to the marking conductor 295. At make springs 224, relay 220 prepares a locking circuit for itself, and at make springs 223 closes a circuit to the hold relay 210 from connector holding ground, by way of the hold conductors 198 and 229.

The hold relay 210 operates over this circuit and at make springs 212 locks to the holding ground on conductor 229 independently of relay 220. At break springs 211, relay 210 disconnects the line relay 215 from the line, thereby causing the release of this relay. At make springs 213, relay 210 completes a locking circuit to the bottom winding of connect relay 220, in series with lockout relay 230 in the intercept trunk, whereupon relay 230 operates. This locking circuit may be traced from ground battery through break springs 271, winding of relay 230, make springs 213, make springs 224, and the bottom winding of relay 220 to negative battery.

Lockout relay 230, upon operating, opens its break contacts 231, thereby removing ground from conductor 278, and hence from the upper winding of connect relay 220. This action is without effect on relay 220 which is locked operated through its lower winding as stated, but it prevents the re-establishment of the operate circuit of the other connect relays when line relay 115 releases. Since the chain circuit 279 through the contacts of the various line relays is now dead, the operation of any of the other line relays at this time is without effect, and all of the other line circuits are therefore locked out. It is thus obvious that only one call at a time can be connected to the intercept trunk.

Relay 230, at its make springs 232, prepares a circuit to pick-up relay 240, from the interrupter pick-up lead 234, and at make springs 233 connects ground to the interrupter start lead 236 to prevent the interrupter from stopping before the trunk has released. Relay 230 also, at its make contacts 231, prepares locking circuits to the counting relays and to relays 240, 250 and 260 in the intercept trunk.

At the end of the first ringing cycle, when the ringing interrupter 238 grounds the time pulse lead 235, nothing results, because of the open contacts 247 and 265 in this circuit. When shortly thereafter, the interrupter grounds the pick-up lead 234, just before the start of the second ringing cycle, pick-up relay 240 operates from this ground, by way of make springs 232 and break springs 246. Should the interrupter be of a type which connects negative battery to the pick-up lead, then the operate windings of the various pick-up relays would be wired to ground, but the operation would be identical.

Pick-up relay 240, upon operating, closes its preliminary make springs 245, thereby locking itself to ground at break springs 271 by way of make contacts 231. It also disassociates itself from the pick-up lead by opening break contacts 246. At make springs 241 and 242, relay 240 connects the line conductors through to the trunk conductors 286 and 287 and to the associated trunk line relays 310 and 315, and at make springs 243 connects ground to the tone machine start lead 259. Finally, at make springs 244, relay 240 prepares a locking circuit for the test relay 450 by way of conductor 285, and at the same contacts 244 completes an operating circuit to transfer relay 320. These two circuits both start from the ground at break springs 271, and extend through make contacts 231 and make springs 244, where they divide and extend to conductors 285 and 288 respectively, the latter branch passing through break springs 261, conductor 288, break contacts 311, break springs 316, and the winding of relay 320 to negative battery.

Transfer relay 320 operates over this circuit and at make contacts 321 connects the ground on conductor 288 to the winding of transfer relay 325 which also operates. Relay 325, at make contacts 326, connects direct ground to the winding of transfer relay 330 which operates. Relay 330 at its make contacts 331 prepares a circuit to transfer relay 335 and counting relay 355. Shortly after the completion of this action, ringing resumes, for the second code cycle.

On the first short ringing impulse of the second code cycle, trunk line relay 310 operates over the following circuit: ringing generator, ringing relay contacts, conductor 209, winding of relay 200, make contacts 204, break contacts 201, make springs 207, conductor 196, positive line conductor 227, make springs 221, positive trunk conductor 248, make springs 241, trunk conductor 286, capacitor 300, winding of line relay 310, and the upper winding of impedance 302 to ground.

Line relay 310 operating, closes make springs 312, but without effect at this time, and at make contacts 311 closes a circuit to test relay 450. This circuit starts from the ground at break springs 271, and extends through make contacts 231, make springs 244, break springs 261, make contacts 311, conductor 385, and the winding of relay 450 to negative battery. Relay 450 operates over this circuit, locks by way of its make springs 451 and conductor 285 to the same ground through make springs 244, and causes the operation of the other test relays 460 and 470, which may be considered as slave relays to relay 450, to supply additional contact points. These three relays upon operating, reverse their break make contacts and prepare intercept circuits representing code signals on the positive side of the line only.

Line relay 310 also, at break contacts 311, opens the circuit to transfer relay 320, and this relay after a delay releases. All four transfer relays 320, 325, 330 and 335 have similar fast-operate, slow-release features, through the use of a heavy copper slug mounted on the core of each relay, at the heel end. Transfer relay 320 releasing, opens make contacts 321 to start the release of relays 325 and 330. These relays will not have time to release, however, on a short ringing pulse. Transfer relay 320 also closes break contacts 321 to complete a parallel circuit to transfer relay 335 and counting relay 355. This circuit goes back to the ground through break springs 271 and extends through make contacts 231, make springs 244, break springs 261, conductor 288, break contacts 321, and make contacts 331, at which point the circuit divides, with one branch going to negative battery through relay 335 and the other to negative battery through relay 355 by way of conductor 334, and break contacts 341, 346 and 351.

Relays 335 and 355 both operate over this circuit. Transfer relay 335, at break springs 336, opens a common point in the operating circuit leading to the four counting relays of Figure 4. Counting relay 355, at make springs 357, prepares a circuit to counting relay 360, and at make springs 358 prepares a tentative circuit to counting relay 410. At make springs 359 relay 355 prepares a portion of the intercept circuit associated with a one-pulse code, represented in the present case by a code signal consisting of one long ring, as may be noted by following conductor 395 from make spring 359 to its terminus in the code terminal block in Figure 4. Relay 355 also, at make springs 356, completes a circuit for counting relay 350. This latter relay is not affected however, due to having ground connected to both sides of its winding at this time, from both conductors 288 and 289.

At the termination of the first ringing pulse, the trunk line relay 310 restores and opens make contacts 311, thereby opening the operate circuit to test relay 450. Relay 450 is not affected however, and remains locked to conductor 285. Line relay 310, at break contacts 311, recloses the circuit to transfer relay 320 from the ground on conductor 288, and relay 320 re-operates. Relay 320 in turn, at make contacts 321, re-closes the circuit to transfer relay 325 from the ground on conductor 288, and at break contacts 321 disconnects this same ground from the branch circuit leading to relays 335 and 355. This latter action permits the release of transfer relay 335 after a short delay, and at the same time removes the ground shunt from counting relay 350, which thereupon operates in series with relay 355, and locks the latter relay in its operated position over the following circuit: ground through break spring 271, make springs 231, conductor 289, break springs 347, winding of relay 350, make springs 356 and the winding of relay 355 to negative battery. Relay 350, at break-make springs 351, disconnects the pulsing conductor 334 from the winding of relay 355, and connects it to the winding of relay 360 to prepare the operation of the latter relay. Relay 350 also, at break springs 352 opens a point in the circuit of counting relay 340, and at break springs 354 opens a point in the circuit of release relay 270. Finally at make springs 353, relay 350 prepares a tentative circuit for the operation of pick-up relay 260.

When the second short ringing pulse of the code is placed on the line, relay 310 again operates, and again opens break contacts 311 to cause the release of transfer relay 320. Relay 320 releasing, again opens the circuit of relay 325 and again connects the ground from conductor 288 to relay 335 and conductor 334, by way of break springs 321 and make springs 331. From conductor 334, this ground extends onward through break contacts 341, break contacts 346, make contacts 351, make springs 357, and the winding of counting relay 360 to negative battery. Relays 335 and 360 operate over these circuits, and relay 335 opens break springs 336 as before, to disable the circuit leading to the counting relays of Figure 4. Relay 360, at make springs 362, prepares a circuit to counting relay 370, at make springs 363 prepares a tentative circuit to counting relay 420, and at make springs 364 prepares a portion of the intercept circuit associated with two-pulse codes as may be verified by following conductor 396 from make springs 364 to its several termini in the code terminal block of Figure 4. Relay 360 also, at make springs 361, completes a circuit for counting relay 345. Relay 345 is not affected however, due to having ground connected to both sides of its winding at this time, from both conductors 288 and 289.

At the termination of the second ringing pulse, line relay 310 again restores, re-closing break contacts 311 to re-operate relay 320. Relay 320, at make contacts 321 re-energizes relay 325, from the ground on conductor 288, and at break contacts 321 disconnects this same ground from relays 335 and 360. The removal of this ground removes the ground shunt from counting relay 345 and this relay now operates in series with counting relay 360, locking the latter relay in its operated position over the following circuit: ground through break springs 271, make contacts 231, conductor 289, break springs 342, winding of relay 345, make contacts 361, and the winding of relay 360 to negative battery. Relay 345, at break-make springs 346, disconnects the pulsing conductor 334 from the circuit leading to counting relays 355, 360 and 390, and connects it to the winding of counting relay 370, to prepare the operation of the latter relay. Relay 345, at make springs 348, prepares a second tentative circuit for the operation of pick-up relay 260 preparatory to the re-opening of make spring 353, and at break springs 349 opens a second point in the circuit of release relay 270 preparatory to the re-closing of break springs 354. Also at break springs 347 relay 345 opens the series circuit holding counting relays 350 and 355 and these relays both release. Relay 335 also releases after a short interval, but without effect at this time.

When the third short ringing pulse of the code is placed on the line, relay 310 again operates, releasing transfer relay 320 as before. The ground from break springs 271 on conductor 288 thereupon passes through break contacts 321 and make contacts 331 to re-operate relay 335. From relay 335 this ground is also extended over the pulsing conductor 334, through break contacts 341, make contacts 346, make springs 362, and the winding of counting relay 370 to negative battery. Counting relay 370 operates over this circuit, and at make springs 371 completes a circuit for counting relay 340. Relay 340 cannot operate at this time however, due to being shunted by ground on both sides of its winding, from both conductors 288 and 289. Counting relay 370 also, at make springs 372 prepares a circuit to counting relay 380; at make springs 373 prepares a tentative circuit to counting relay 430; and at make springs 374 prepares a portion of the intercept circuit which is associated with three-pulse codes, as may be verified by tracing the conductor 397 from springs 374 to its several termini in the terminal block 485 in Figure 4.

At the termination of the third ringing pulse, line relay 310 again releases, re-operating transfer relay 320 as before. Relay 320 at make contacts 321 again re-energizes transfer relay 325, and at break contacts 321 opens the operate circuit to transfer relay 335 and counting relay 370. This removes the shunt from counting relay 340 causing this relay to operate in series with relay 370, and locking the latter relay operated over the following circuit: ground from break springs 271, make springs 231, conductor 289, break springs 352, winding of relay 340, make springs 371, and the winding of relay 370 to negative battery. Counting relay 340 upon operating, at break-make springs 341 disconnects the pulsing conductor 334 from the circuit leading to the other counting relays and connects it to the winding of relay 380 in preparation for the next ringing pulse. Relay 340 at make springs 343 prepares a third tentative circuit to pick-up relay 260 preparatory to the re-opening of make springs 348, and at break springs 344 opens a third point in the circuit of release relay 270 preparatory to the re-closing of break springs 349. At break springs 342 relay 340 opens the series circuit holding counting relays 345 and 360, and these relays both release. Relay 335 also releases after an interval, but without effect at this time.

When the fourth short ringing pulse is placed on the line, relay 310 again operates, and again releases transfer relay 320. Ground from break springs 271 on conductor 288 again passes through break contacts 321 and make contacts 331 to again operate relay 335. The same ground also passes over pulsing conductor 334, through make contacts 341, make springs 372 and the winding of counting relay 380 to negative battery. Counting relay 380 operates over this circuit, and at make springs 382 completes a circuit to counting relay 350 but without effect, since relay 350 again has ground on both sides of its winding, as previously explained. Relay 380 also, at make springs 381 prepares a circuit to counting relay 390; at make springs 383 prepares a tentative circuit to counting relay 440; and at make springs 384 prepares a portion of the intercept circuit associated with four-pulse codes, as may be verified by tracing conductor 398 from make springs 384 to its several termini in the terminal block 485 in Figure 4.

At the termination of the fourth ringing pulse line relay 310 again releases and again causes the operations of transfer relay 320, which again energizes transfer relay 325, and opens the operate circuit to transfer relay 335 and counting relay 380. This latter operation removes the shunt from counting relay 350, causing this relay to operate in series with counting relay 380 and to lock the latter relay operated over the following circuit: ground from break springs 271, through make springs 231, conductor 289, break springs 347, winding of relay 350, make springs 382 and the winding of relay 380 to negative battery. Counting relay 350 upon operating, at make contacts 351 closes an additional point in the operating circuit of counting relay 390; at make springs 353 re-closes the first tentative circuit to pick-up relay 260 preparatory to the opening of make springs 343; and at break springs 354 re-opens the first point in the circuit of release relay 270 preparatory to the re-closing of break springs 344. At break springs 352, relay 350 opens the series circuit holding counting relays 340 and 370 operated, and these relays both release. Relay 335 also releases, after an interval.

When the fifth, and last, short ringing pulse is placed on the line, line relay 310 again operates, and again releases transfer relay 320. Ground from break springs 271 on conductor 288 is again extended through break contacts 321 and make contacts 331 and again operates transfer relay 335. This same ground is also extended to counting relay 390 by way of pulsing conductor 334, break contacts 341, break contacts 346, make contacts 351, and make springs 381. Counting relay 390 operates and at make springs 391 completes a circuit to counting relay 345, but without effect at this time due to relay 345 being again shunted by ground on both sides of its winding, as previously explained. Relay 390 also, at make springs 392 prepares a portion of the intercept circuit associated with five-pulse codes, as may be verified by tracing conductor 399 from make springs 392 to its several termini in the code terminal block 485 in Figure 4.

At the termination of this fifth and last ringing pulse, line relay 310 again operates transfer relay 320, again re-energizes transfer relay 325, and again opens the operate circuit to transfer relay 335 and counting relay 390. Removal of ground from the operate circuit of relay 390 removes the shunt from counting relay 345 and this relay operates in series with relay 390 from the ground on conductor 289, through break springs 342, winding of relay 345, make springs 391, and the winding of the operated relay 390 to negative battery. Counting relay 345 upon operating, at make springs 348 re-closes the second tentative circuit to pick-up relay 260 preparatory to the opening of make springs 353, and at break springs 349 re-opens the second point in the circuit of release relay 270 preparatory to the re-closing of break springs 354. At break springs 347, relay 345 opens the series circuit holding counting relays 350 and 380 operated, and these relays both release. Relay 335 also releases after an interval but without effect, as before. Trunk relays 230, 240, 320, 325, 330, 345, 390, 450, 460 and 470 remain operated.

At the end of the second ringing cycle, the interrupter again grounds the time pulse lead 235, but again without effect, due to the open contact springs 265 and 349. Shortly thereafter, when the interrupter again grounds the pick-up lead 234 to mark the start of the third ringing cycle, pick-up relay 260 is caused to operate over the following circuit: ground on conductor 234, make springs 232, conductor 292, make springs 348, conductor 291, break springs 264, and the winding of relay 260 to negative battery. Relay 260 closes preliminary make contacts 263 and thereby locks itself to the ground at break springs 271, by way of make springs 231 and conductor 289, and opens break springs 264, to disconnect its winding from the pick-up circuit. Relay 260 also, at make springs 262 prepares a circuit to the intercept relay 250; at make springs 265 prepares a circuit to the release relay 270; and at break springs 261 disconnects the ground from break springs 271 from conductor 288, in order to prevent any further operation of the counting relays. Removal of this ground from conductor 288 also causes the release of the transfer relays 320, 325 and 330 one after the other.

When the first pulse of ringing current in the third ringing cycle is impressed on the line, line relay 310 again operates its contacts 311 but without effect, due to the aforementioned absence of ground on conductor 288. At make springs 312 however, relay 310 completes a circuit to the intercept relay 250 as follows: ground through make springs 225, the dotted marking conductor 295, terminal block 485, make contacts 465, break contacts 442, break contact 426, conductor 399, make springs 392, make springs 312, conductor 290, make springs 262, and the winding of relay 250 to negative battery.

The intercept relay 250 operates over this circuit, and at make springs 253 locks to the ground at break springs 271 through make springs 231. At make springs 251 and 252, relay 250 connects resistor 239 across the trunk conductors, and at make springs 252 it also connects the tone lead 257 to the trunk conductor 249, through the capacitor 258.

The shunt thus placed across the trunk conductors by resistor 239 completes a direct current circuit through the ring-cut-off relay as follows: negative battery at the ringing generator ringing relay contacts, conductor 209 and relay 200, make contacts 204, break contacts 201, make springs 207, conductors 196 and 227, make springs 221, 241 and 251, resistor 239, make springs 252, 242 and 222, conductors 228 and 197, make springs 208, break contacts 202 and make contacts 205 to ground. Relay 200 operates over this circuit and locks, and at break contacts 201 and 202 disconnects the ringing current from the called line. At make contacts 201 and 202, relay 200 connects the calling line through to the intercept trunk, and at the same time cuts the intercept tone through to the calling loop, via the loop conductors 195 and 194. The first code pulse of the third ringing cycle is thus cut off at its inception, and the calling party immediately thereafter hears the intercept signal. The call is not registered, due to the high resistance of resistor 239 which prevents the operation of any metering or back bridge relays in the conductor.

The intercept signal, unless the calling party releases immediately on hearing it, remains on the line for the duration of the third ringing cycle. At the end of the third ringing cycle, when the interrupter again grounds the time pulse lead 235, this ground passes through the now closed make springs 265 to negative battery through the winding of release relay 270, thereby operating this relay momentarily. Release relay 270 operating, opens break springs 271. This removes locking ground from the operated relays 220, 230, 240, 250, 260, 345, 390, 450, 460, and 470, thereby causing the release of these relays, and freeing the intercept trunk. The hold relay 210 remains locked to the connector hold lead until the calling party hangs up.

It is thus seen that seizure of the intercept trunk occurs during the first ringing cycle, that testing takes place during the second ringing cycle, that interception occurs at the start of the third ringing cycle, and that the automatic release takes place at the end of the third ringing cycle. The intercept trunk is therefore held by each call for a maximum of twenty-four to thirty seconds, and the intercept tone is on the line for a maximum of eight seconds. The maximum call handling capacity of the trunk is therefore between 120 and 140 calls per hour.

If the calling party, upon hearing the intercept tone, hangs up immediately, the connector switch releases and removes holding ground from the hold conductor 229. Hold relay 210 thereupon releases and opens its make springs 213, thus opening the circuit of the connect and lockout relays 220 and 230, which also release. Lockout relay 230 thereupon opens its make contacts 231, thereby removing locking ground from the other trunk relays, which also release and free the intercept trunk.

In the case of a call to line 92 for a station not marked for interception, as for example a station signalled with two short rings on the positive side of the line, the operation will be similar to that already described, except that interception will not occur. Thus, when the first pulse of ringing current is put on the line relay 215 operates momentarily, and causes the operation of the hold connect and lockout relays 210, 220 and 230. At the start of the second ringing cycle, relay 240 operates as before from the pick-up pulse, and on the first ringing pulse of the second ringing cycle, counting relays 355 and 350 again operate, together with test relays 450, 460 and 470, in response to the operation of the trunk line relay 310. On the second and last pulse of the ringing code, the counting relays 360 and 345 operate, exactly as before, unlocking relays 355 and 350, which release. At the start of the third ringing cycle, pick-up relay 260 again operates from the pick-up lead by way of make springs 348, to prepare the circuit of the intercept relay as before. This time however, when the line relay 310 closes its make contacts 312 on the first ring of the third cycle, relay 250 does not operate, due to the absence of marking ground, and the call is not intercepted. At the end of the third code cycle, the trunk is released automatically as before, when the interrupter grounds the time pulse lead to operate release relay 270, by way of make springs 265. All operated relays in the intercept trunk and the intercept line circuit then release, except for the hold relay 210, which remains locked to the connector. Relay 210 remains locked in this manner for the balance of the call, in order to keep the line relay 215 disconnected from the line. Otherwise, if the called party has not yet answered when the trunk releases, the ringing current would again operate relay 215, and permit re-seizure of the trunk by the same call.

Assuming now a call to line 93, to the station, for example, whose signal consists of one short ring followed by two long rings, on the negative side of the line, the operation will again be quite similar to that already described, but with some important differences. This time, for instance, the switching relay 203 in the connector will not operate in response to the final digits of the called number, but will remain normal. Upon the operation of connector pick-up relay 206 therefore, a circuit is completed to intercept line relay 215′ as follows: ringing generator, conductor 209, ring-cut-off relay 200, break contacts 205 and 202, make springs 208, conductors 197 and 228′, capacitor 217′, break springs 211′, winding of relay 215′, resistor 219′, conductors 227′ and 196, make springs 207, and break contacts 201 and 204 to ground.

Line relay 215′ operates over this circuit, and at make contacts 216′ completes a circuit to the connect relay 220′ as follows: ground through break springs 271, break contacts 231, conductor 278, break contacts 216, conductor 279 and break contacts on the other line relays, make contacts 216′, and the upper winding of relay 220′ to negative battery. The connect relay operates over this circuit, and at make springs 223′ connects ground on the hold lead 229′ to the hold relay 210′ which also operates. Relay 220′ also, at make springs 225′ connects marking ground to the marking conductor 296, and at make springs 221′ and 222′ connects the line through to the trunk conductors 248 and 249, by way of conductors 275 and 276, which are common to all of the intercept line circuits.

Hold relay 210′, upon operating disconnects the line relay and completes a locking circuit for connect relay 220′ in series with the lockout relay 230 as follows: ground through break springs 271, winding of relay 230, conductor 277 which is also common to all of the intercept line circuits, make springs 213′, make springs 224′, and the lower winding of relay 220′ to negative battery. Lockout relay 230 operates over this circuit and again removes the line-circuit operating ground from conductor 278, to prevent the operation of any other connect relays at this time. Relay 230 also, at make springs 233 and 232, grounds the interrupter start lead and connects the pick-up lead 234 to the pick-up relay 240.

At the end of the first ringing cycle, the interrupter again grounds the time pulse lead 235 without effect. Shortly thereafter however, at the start of the second ringing cycle, the interrupter again grounds the pick-up lead 234, thereby operating the pick-up relay 240 which locks as before to the ground at break springs 271, and connects the line conductors through to the trunk conductors 286 and 287 and to the associated line relays 310 and 315. At make springs 244 relay 240 connects ground from break springs 271 to conductor 288 as before, by way of make contacts 231 and break springs 261. Transfer relays 320, 325 and 330 again operate from this ground, and prepare the circuits for the counting relays.

Ringing now resumes for the second code cycle and being on the negative side of the line, operates line relay 315 instead of 310, over the following circuit: ringing generator, conductor 209, winding of relay 200, break contacts 205 and 202, make springs 208, conductors 197 and 228', make springs 222', conductors 276 and 249, make springs 242, conductor 287, capacitor 301, winding of relay 315, and the lower winding of impedance 302 to ground.

On the first ring of the code therefore, which is as stated, a short pulse of ringing current, line relay 315 operates and closes make springs 317, but without effect at this time. At break springs 316, relay 315 also opens the circuit to transfer relay 320 which releases. At make springs 321, relay 320 opens the circuit to transfer relay 325 in the usual manner, and at break springs 321 again connects the grounded conductor 288 through to the counting relays. Transfer relay 335 and counting relay 355 operate from this ground. Test relays 450, 460 and 470 do not operate when the ringing current is on the negative side of the line. At the termination of the first ringing pulse, line relay 315 restores and re-operates relay 320. Relay 320 at make contacts 321 re-establishes the circuit of relay 325 and at break contacts 321 disconnects conductor 288 from relays 335 and 355. Relay 335 thereupon releases as before, and counting relay 350 operates, in series with relay 355.

On the second ring of the code, which is a long pulse, line relay 315 again operates, and again opens its break springs 316. Transfer relay 320 now releases, opens make contacts 321 to open the circuit to transfer relay 325, and closes break contacts 321. The closing of break contacts 321 connects the ground from conductor 288 to transfer relay 335 and counting relay 360, which both operate. Because of the long pulse of ringing current, which holds break springs 316 open approximately three times as long as a short pulse, transfer relay 320 also remains released for a longer period than usual, thereby giving time for the release in cascade, or in succession, of both transfer relays 325 and 330.

Upon the release of transfer relay 330, make contacts 331 open and break contacts 331 close. The closing of break contacts 331 prepares a circuit for the operation of the counting relays of Figure 4. The opening of make contacts 331 removes the operating ground from transfer relay 335 and counting relay 360. This permits the operation of counting relay 345 which locks in series with 360, and releases counting relays 350 and 355. Transfer relay 335 also releases, after the usual delay, and closes break springs 336 to complete a circuit to counting relay 420 as follows: ground from break springs 271, make contacts 231, make springs 244, break springs 261, conductor 288, break contacts 321, break contacts 331, break springs 336, make springs 363, conductor 387 and the lower winding of relay 420 to negative battery. Counting relay 420 operates over this circuit and at make springs 427 locks through its upper winding to locking ground on conductor 289. Counting relay 420 also, at its make contacts 421, 422, 423, 424, 425 and 426 prepares intercept circuits associated with those codes having a long ring as the second pulse of the code of which there are eight, as may be verified by tracing these circuits out to the terminal block 485. At the termination of the second ringing pulse, line relay 315 restores, and transfer relays 320, 325, and 330 re-operate in readiness for the next pulse.

On the third ring of the code which is also a long pulse, line relay 315 re-operates and again opens break springs 316. Transfer relay 320 thereupon releases, opens make contacts 321 to open the circuit to transfer relay 325 and closes break contacts 321. The closing of break contacts 321 connects ground from conductor 288 to transfer relay 335 and counting relay 370 which both operate. Because of the long ring, transfer relay 320 remains released long enough for transfer relays 325 and 330 to also release.

When transfer relay 330 releases, make contacts 331 again open and break contacts 331 again close. The closing of break contacts 331 again prepares a circuit for the operation of the counting relays of Figure 4, while the opening of make contacts 331 removes the operating ground from transfer relay 335 and counting relay 370. Removal of this operating ground removes the shunt from counting relay 340 which operates in series with counting relay 370, and releases counting relays 345 and 360. Transfer relay 335 also releases in due course and at break contacts 336 completes a circuit to counting relay 430 as follows: ground from break springs 271, make contacts 231, make springs 244, break springs 261, conductor 288, break contacts 321, break contacts 331, break springs 336, make springs 373, conductor 388, and the lower winding of relay 430 to negative battery. Counting relay 430 operates over this circuit and at make springs 435 locks through its upper winding to locking ground on conductor 289. Counting relay 430 also at make contacts 431, 432, 433 and 434 prepares intercept circuits associated with those codes having a long ring as the third pulse of the code, which are four in number, as may be determined by following these circuits to the code terminal block 485. At the termination of the third ringing pulse line relay 315 restores, and transfer relays 320, 325 and 330 reoperate. Relays 210', 220', 230, 240, 320, 325, 330, 340, 370, 420 and 430 are now operated.

At the end of the second ringing cycle the interrupter again grounds the time pulse lead, but again without effect. Shortly thereafter when the pick-up lead is grounded to start the third ringing cycle, pick-up relay 260 operates from this ground by way of make spring 232, conductor 292, make springs 343 and conductor 291. Relay 260 locks itself to the ground at break springs 271, closes make springs 262 and 265 to prepare the intercept and release circuits, and opens break springs 261 to prevent further operation of the counting relays. The opening of springs 261 also causes the release of transfer relays 320, 325 and 330.

On the first pulse of the third ringing cycle line relay 315 again operates and opens break springs 316 but without effect since this circuit is already dead. At make springs 317 however, relay 315 completes a circuit for the intercept relay 250 as follows: ground through make springs 225', the dotted marking conductor 296, terminal block 485, break contacts 452, make contacts 432, make contacts 423, break contacts 412, conductor 397, make springs 374, make springs 317, conductor 290, make springs 262 and the winding of relay 250 to negative battery.

The intercept relay 250 now operates and locks in the manner previously explained, and at make springs 251 and 252 again connects resistor 239 across the line to trip the ring-cut-off relay 200, and prepares the intercept tone circuit at the same make springs 252, by way of conductor 257 and capacitor 258. The shunt across the line causes the ring-cut-off relay 200 to operate over the following circuit: negative battery at the ringing generator, conductor 209 and relay 200, back contacts 205 and 202, make springs 208, conductors 197 and 228', make springs 222', conductors 276 and 249, make springs 242 and 252, resistor 239, make springs 251 and 241, conductors 248 and 275, make springs 221', conductor 227', conductor 196, make springs 207, and break contacts 201 and 204 to ground battery. Cut-off-relay 200 locks operated, disconnects the ringing current from the called line, and connects the intercept tone through to the calling line loop by way of conductors 195 and 194 as before.

At the end of the third ringing cycle, when the interrupter again grounds the time pulse lead 235 release relay 270 operates, by way of make springs 265, and opens break contacts 271 to release the intercept trunk and the connect relay 220'. The hold relay 210' remains locked to the connector hold lead 229' until the calling party hangs up.

It will now be apparent that any of the twenty codes listed on the right hand side of Figure 4, regardless of the side of the line on which they may be impressed, can be intercepted for any line merely by making the necessary cross-connections between the associated connect relay and the terminal block 485, assuming of course that the intercept line circuit is already connected to the line involved. And of course any line circuit can be connected to any party line by connecting up the two line wires and the hold wire of such intercept line circuit to the proper terminals of such line.

Should it occur that the intercept trunk here described is seized, by a call or otherwise and ringing on the line is stopped after operating line relay 215, due to a fault or due to another party on this line removing his receiver, so that the lockout relay 230 has become locked up to a pair of hold and connect relays in one of the intercept line circuits, the release of the trunk takes place in the following way. Upon the operation of lockout relay 230, make springs 233 connect ground to the interrupter start lead 236, thereby insuring the operation of this equipment, while make springs 232 connect the pick-up lead 234 to the pick-up relay 240. When therefore, the interrupter next puts ground on the pick-up lead, relay 240 operates and locks, and closes make springs 247 to prepare a circuit for release relay 270. When now, the interrupter next puts ground on the time pulse lead, a circuit is completed to relay 270 as follows: ground on lead 235, makes springs 247, conductor 294, break springs 354, 349, and 344, conductor 293, and the winding of relay 270 to negative battery. Relay 270 thereupon operates and at break springs 271 removes locking ground from the lockout and connect relays, which then release and free the trunk. This prevents tying up the trunk due to a fault.

What is claimed is:

1. In a telephone system having multi-party lines each having a pair of line conductors, and each having one or more parties thereon removed from service, with means for extending a call from a calling line to any one of said party lines and for impressing different ringing signals on either line conductor of said one line, a call intercept trunk common to said party lines, an intercept line circuit individual to each of said party lines, a line relay in said intercept line circuit operated in response to any of said signals on either line conductor, means responsive to the operation of said line relay for connecting both of said line conductors to said common intercept trunk, means for preventing the connection of more than one call at a time, to said common intercept trunk, and means in said intercept trunk also operated in response to any of said ringing signals in case said ringing signals correspond to a party removed from service for causing the discontinuance of said ringing signals and for transmitting an intercept signal to the calling line.

2. In a telephone system having multiparty lines, each having a pair of line conductors, and each having one or more stations removed from service, with means for extending a call to any one of said party lines and to the intercept line circuit associated therewith, and for impressing different ringing signals on either line conductor of said party line to signal the different stations, a call intercept trunk common to said party lines, an individual intercept line circuit associated with each of said party lines, a line relay connected in said line circuit and operated in response to any of said signals on either line conductor, means responsive to the operation of said line relay for extending the call to said intercept trunk, means for preventing the connection of more than one call at a time to said intercept trunk, means in said intercept trunk also operated in response to said ringing signals for intercepting calls to predetermined stations on said party line removed from service and connecting an intercept tone to said party line on calls intercepted, means for disconnecting said line relay from the line circuit after its initial operation, means for keeping said line relay disconnected from the circuit until the calling party has released, and a unidirectional current conducting device associated with said line relay in such a way as to guard against false operation of said line relay from dial pulses on outward calls from said party line.

3. In a telephone system having a party line having a pair of line conductors, with means for extending a call to said party line and for impressing different ringing signals on either line conductor thereof to signal the different stations thereon, a call intercept circuit comprising an intercept line circuit connected to said party line and an intercept trunk, means in said line circuit operated in response to said signals to cause the seizure of the intercept trunk, means in said trunk operative in response to said ringing signals to determine the line conductor of the line over which said ringing signals are impressed, other means in said trunk also operative in response to said signals under control of said determining means, and means responsive to the operation of said other means for intercepting calls to any predetermined ones of said station and for giving a special signal to the calling party on calls intercepted.

4. In a telephone system including a multistation party line, and means for extending calls to said party line and connecting different ringing signals thereto, a call intercept circuit comprising an intercept line circuit and an intercept trunk; a line relay, a connect relay and a hold relay in said line circuit, said line relay being connected in bridge of said line; said line relay being operated in response to said signals to cause the operation of said connect and hold relays, means operated by said connect relay to connect the call to the intercept trunk, means operated by said hold relay to disconnect said line relay from in bridge of said line for the balance of the ringing, means in said intercept trunk for intercepting predetermined calls to stations on said party line removed from service and for returning a special signal to the calling party, and automatic means for disconnecting said special signal and for releasing said intercept trunk and said connect relay after a predetermined time interval.

5. In a telephone system including a party line and apparatus for extending a call to said party line and connecting ringing signals thereto to signal the different stations, a call intercept trunk common to a plurality of said party lines, means for seizing said intercept trunk on all calls to said line and for connecting said signals to said trunk, apparatus in said trunk controlled at least in part by said signals to intercept predetermined calls to said line by cutting off the ring and giving a momentary special signal to the calling party, means to cause automatic release of said trunk after a predetermined time interval on both intercepted and non-intercepted calls, and means for automatically releasing said trunk after a predetermined time interval in cases where seizure is not followed by ringing on the line.

6. In a telephone system including multiparty lines each having a pair of line conductors with means for extending calls to any one of said lines and means including a ringing interrupter for impressing ringing signals of different frequencies on either line conductor of said line, a call intercept trunk common to said party lines, an intercept line circuit associated with each of said party lines, a line relay connected in said line circuit and operated by any of said signals on either line conductor of the line to cause the call to be connected to the intercept trunk, means to permit only one call to be connected to said trunk at any one time, automatic means for disconnecting said line relay from the line circuit after its initial operation, frequency responsive relays in said trunk, automatic means for connecting said frequency relays to the line conductor being rung on said party line, means for causing the operation of a particular one of said frequency relays by said ringing signals in case said signals correspond to the signal of a station whose calls are to be intercepted, means controlled by the operation of said one frequency relay for giving a momentary special signal to the calling party to indicate interception, and means controlled from said ringing interrupter for automatically disconnecting and releasing said intercept trunk after a predetermined time interval on both intercepted and non-intercepted calls.

7. In a telephone system including a party line having a pair of line conductors, with means for extending a call to said party line and connecting ringing signals of different frequencies to either line conductor thereof, a call intercept circuit comprising an intercept line circuit individual to said party line and an intercept trunk common to a plurality of said party lines, a line relay in said line circuit operated by said signals to cause the call to be connected to said trunk, automatic means for dis-associating said line relay from said signals immediately following its operation, means for keeping said line relay so dis-associated until the calling party has released the call, frequency responsive relays in said trunk, a test relay in said trunk controlled by said signals to cause said frequency relays to be connected to the proper line conductor of the line being rung, automatic means for dis-associating said test relay from said signals immediately following its operation, means for keeping said test relay so dis-associated until the call has been disconnected from said trunk, means for causing the operation of a particular one of said frequency relays by said ringing signals in case said signals correspond to the signal of a station whose calls are to be intercepted, means operated in response to the operation of said frequency relay to intercept the call by cutting off the ring and giving a momentary special signal to the calling party as an indication that the call has been intercepted, and automatic means for disconnecting and releasing said trunk after a predetermined time interval.

8. In a telephone system including a multistation party line having a pair of line conductors, with means for extending calls to said party line and impressing ringing signals of different frequencies repeated intermittently in recurrent ringing periods on either line conductor of said party line to signal the different stations, a call intercept line circuit associated with said party line, an intercept trunk, a line relay, a connect relay and a hold relay in said line circuit, said line relay being operated by said ringing signals to operate said connect and hold relays; means operated by said connect relay to connect the call to said intercept trunk, means operated by said hold relay to disassociate said line relay from the line, frequency responsive relays in said trunk one for each frequency, a ringing responsive test relay in said trunk controlled by said ringing signals to cause said frequency relays to be connected to the line conductor of the line being signalled, means for causing the operation of a particular one of said frequency relays by said ringing signal in the case of a call to be intercepted, means controlled by the operation of said frequency relay to intercept the call and give a special signal to the calling party indicative of such interception, said special signal being on the line during the balance of the initial ringing period and all of the second ringing period, a ringing interrupter, and automatic means controlled from said ringing interrupter for disconnecting said signal and releasing said trunk at the end of the second ringing period.

9. In a telephone system having multi-station party lines, with means for extending calls to any given one of said party lines and impressing ringing signals of different frequencies on either line conductor of said one party line, a call intercept circuit comprising an intercept line circuit individual to each of said party lines and an intercept trunk common to said party lines, a line relay, a connect relay, and a hold relay in each said line circuit, said line relay being in bridge of said line and operated by any of said ringing signals on either line conductor of the associated line to operate said connect and hold relays; means operated by said connect relay to connect the call to said common intercept trunk, means to permit only one call to be connected to said common trunk at any one time, means operated by said hold relay to disconnect and hold said line relay disconnected from in bridge of the line for the balance of the duration of the call, frequency responsive relays in said trunk, a ringing responsive test relay in said trunk connected to said line in response to said connection of said call to said trunk and operated by any of said ringing signals on a particular line conductor of the line to cause said frequency relays to be connected to the corresponding line conductor of the line being rung, means responsive to the operation of said test relay to disconnect and hold said test relay disconnected from the line until said trunk has been freed from the call, means in said intercept circuit for marking for interception calls to predetermined stations on said party line, means including said marking means for causing the operation of one of said frequency relays by said ringing signal on a call to be intercepted, means operated in response to the operation of said one frequency relay to intercept the call and give a momentary special signal to the calling party, a ringing interrupter, and automatic means in said trunk operated by pulses from said ringing interrupter for disconnecting and releasing said trunk after a predetermined interval, on both intercepted and non-intercepted calls.

10. In a telephone system including a party line having a plurality of stations thereon connected for service and one or more stations disconnected from service, with means for extending a call to said party line and for applying ringing current thereto to selectively signal a desired station thereon, a call intercept trunk common to a plurality of such party lines, means responsive to said ringing current for seizing said common intercept trunk and for making said trunk busy to other calls, and means for automatically releasing said trunk after a predetermined time period in case said extended call is for a station on said party line connected for service and for automatically releasing said trunk after a different predetermined time period in case said call is for a station on said party line disconnected from service.

11. In a telephone system, an intercept line circuit, an intercept trunk common to said line circuit and other intercept line circuits, a pair of line conductors in said trunk, selective ringing responsive devices in said trunk normally connected to one of said line conductors, means for establishing a connection with said intercept line circuit, a first ringing responsive relay in said line circuit operated by ringing current applied to said line circuit in response to the establishment of said connection, means responsive to the operation of said first relay for connecting said line circuit to said common intercept trunk, and a second ringing responsive relay normally connected to the other of said line conductors of said trunk and operated by ringing current applied to said other line conductor of said trunk in response to said connection for disconnecting said selective devices from said one line conductor of said trunk and for connecting said selective devices to said other line conductor of said trunk.

12. In a telephone system, an intercept line circuit, an intercept trunk common to said line circuit and other intercept line circuits, a pair of line conductors in said trunk, selective ringing responsive devices normally connected to one of said line conductors of said trunk, intercept marking leads provided for subscribers' lines having one or more stations thereon removed from service, certain of said marking leads normally connected to said selective devices and other of said marking leads normally disconnected from said selective devices, means for establishing a connection with said intercept line circuit, a first ringing responsive relay in said line circuit operated by ringing current applied to said line circuit in response to the establishment of said connection, means responsive to the operation of said first relay for connecting said line circuit to said common intercept trunk, a second ringing responsive relay normally connected to the other line conductor of said trunk and operated in response to the connection of ringing current to said other line conductor of said trunk for disconnecting said selective devices from said one line conductor of said trunk and for connecting said selective devices to said other line conductor of said trunk, and means operated by said second relay for disconnecting said certain marking leads from said selective devices and for connecting said other marking leads to said selective devices.

13. In a telephone system having a multiparty line with a pair of line conductors, with means for extending a call to said party line and impressing coded ringing signals on either line conductor of said line to signal the different stations thereon, a call intercept line circuit connected to said party line, a call intercept trunk common to a plurality of such lines, a line relay in said line circuit operated by any of said signals regardless of the line conductor of the line being rung to cause all calls to said line to be connected to said intercept trunk, testing means in said trunk operated by said signals for automatically determining the particular line conductor of the line being rung, counting means in said trunk operated in response to said signals to count the rings in the code, and means including said counting means and said testing means for intercepting calls to predetermined stations on said party line and giving a momentary special signal to the calling party indicative of such interception.

14. In a telephone system including a multiparty line having a pair of line conductors and also including means for extending a call to said party line, together with means including ringing interrupter for impressing on either of said line conductors coded ringing signals consisting of combinations of short rings, combinations of long rings, or combinations of long and short rings, a call intercept line circuit individual to said multiparty line, a call intercept trunk common to a plurality of such lines, a line relay in said line circuit operated by any of said signals on either line conductor of the line to cause the call to be connected to said intercept trunk, means in said trunk to determine the line conductor of the line being rung; counting means in said trunk operated in response to said signals to count the number of rings in the code, the number of long rings and the position of said long rings in the code; means including said counting and determining means for intercepting calls to any stations on said party line removed from service and for giving a momentary intercept signal to the calling party on calls so intercepted, and means controlled from said ringing interrupter for automatically releasing and disconnecting said trunk after a predetermined period of time.

15. In a telehpone system having party lines, with means for extending calls to any one of said party lines and for impressing coded ringing signals repeated intermittently in recurrent ringing periods on either side of said party line to signal the different stations, a call intercept circuit comprising an intercept line circuit for each of said party lines and an intercept trunk common thereto, a line relay in said line circuit operated by said signals to cause the call to be connected to said trunk during the first ringing period, other line relays in said trunk one of which is operated by said signals during the second ringing period, test relays in said trunk operated by said other operated line relay to designate the side of the line being rung, counting relays in said trunk also operated by said other operated line relay to count the rings of the code, means in said trunk controlled in part by said counting and test relays to intercept predetermined calls after the end of the second ringing period and connect an intercept signal to the calling line to indicate interception, and means to disconnect said intercept signal and release said trunk at the end of the third ringing period.

16. In a telephone system having party lines, with means for extending a call to any one of said party lines and for impressing coded ringing signals intermittently on said party line to signal the different stations, a call intercept circuit comprising an intercept line circuit individual to each of said party lines and an intercept trunk common thereto, a line relay in said line circuit operated by said signals to cause the call to seize said common trunk during the first ringing period, means to prevent seizure of said trunk by more than one call at any one time, other line relays in said trunk one of which is operated by said signals during the second ringing period, test relays in said trunk controlled by said other operated line relay to designate the side of the line being rung, counting relays in said trunk also operated by said other operated line relay to count the pulses of ringing current in the code, means to disconnect said counting relays from said other line relays upon the completion of the second ringing period, means controlled at least in part by said counting and test relays to cause interception of predetermined calls after the completion of the second ringing period by cutting off the ring and connecting a special intercept signal to the calling line on calls intercepted, and means to disconnect and release said trunk and said signal automatically after a predetermined time interval.

17. In a telephone system including a multi-station party line, with means for extending a call to said party line and for impressing coded ringing signals in intermittent ringing periods of one or more short rings, one or more long rings or a combination of long and short rings on either side of said party line to signal a particular station, a call intercept line circuit associated with said party line, an intercept trunk common to a plurality of such party lines, a line relay, a connect relay and a hold relay in said line circuit, said line relay being operated by said signals during the first ringing period of the call to operate said connect and hold relays; means operated by said connect relay to connect the call to said common trunk, means to permit only one call to be connected to said trunk at any one time, means operated by said hold relay to disassociate said line relay from the line for the remainder of the call, other ringing responsive line relays in said intercept trunk, means to connect said other line relays to said line just before the start of the second ringing period, one of said other line relays being then operated by the ringing pulses during said second period, test relays in said trunk controlled by said other line relays to determine the side of the line being signalled, counting relays in said trunk operated by said operated one of the other line relays during the second ringing period to count the number of ringing pulses and determine the number and location of the long pulses, means controlled by said counting and testing relays to intercept calls to any predetermined station or stations on said party line after the second ringing period, means to give a momonetary special signal to the calling party on calls so intercepted, and automatic means to disconnect and release said intercept trunk at the end of the third ringing period.

18. In a telephone system including a multi-station party line and a ringing interrupter, with means including said interrupter for impressing coded ringing signals on said party line in intermittent ringing periods utilizing long and short pulses of ringing current in various combinations to signal the different stations on either side of said line, a call intercept line circuit associated with said party line, an intercept trunk common to a plurality of such party lines, a line relay, a connect relay and a hold relay in said line circuit, said line relay being operated by said signals during the first ringing period to operate said connect and hold relays; means operated by said connect relay to connect the call to said intercept trunk, means to permit only one call to be connected to said trunk at any one time, means operated by said hold relay to disconnect said line relay from the line for the remainder of the call, other line relays in said intercept trunk, means controlled from said interrupter to connect said other line relays to said line just before the start of the second ringing period, one of said other line relays being operated by said ringing current pulses during said second ringing period, test relays in said trunk controlled from the operated one of said other line relays to identify the side of the line being rung, counting relays in said trunk operated by the operated one of said other line relays during the second ringing period to count the pulses comprising the signal and locate and identify any long pulses therein, means controlled from said interrupter to stop said counting at the end of the second ringing period, marking means in said line circuit for marking for interception calls to any station, means controlled by said interrupter and by said marking means and by said counting and test relays to intercept calls so marked after the completion of the second ringing period and give a momentary special signal to the calling party on calls intercepted, and means controlled from said interrupter to cause automatic release and disconnection of said trunk at the end of the third ringing period.

19. In a telephone system having a line and a cyclically operated ringing apparatus for selectively transmitting a variable number of ringing signal pulses of short or long duration during each cycle operation thereof, a chain of counting relays sequentially operated and released in a predetermined order in response to successive signal pulses during one cycle operation of said ringing apparatus for counting the number of signal pulses transmitted during said one cycle; other relays individually corresponding to said counting relays, operating circuits for operating said other relays successively prepared by the successively operated counting relays, relay means operated by a signal pulse of long duration during said one cycle for completing the prepared operating circuit of the particular one of said other relays corresponding to the particular counting relay which is operated in response to said long duration pulse, and call intercepting means controlled jointly by the last operated counting relay and the operated ones of said other relays for intercepting predetermined calls routed to said line.

20. In a telephone system including a line and a cyclically operated ringing apparatus for selectively transmitting a variable number of ringing signal pulses of short or long duration over said line during each cycle of operation thereof, a chain of counting relays sequentially operated by successive signal pulses during one cycle operation of said apparatus for counting the number of signal pulses transmitted during said one cycle, other relays corresponding to said counting relays and individually controlled thereby, relay means operated by signal pulses of long duration during said one cycle for operating certain ones of said other relays under control of the corresponding counting relays operated in response to these signal pulses of long duration, and call intercepting means controlled in accordance with the setting of said counting relays and in accordance with the operated ones of said other relays for intercepting predetermined calls routed to said line.

21. In a telephone system including a line ringing apparatus operative to provide code ringing signals consisting solely of a variable number of short rings and code ringing signals consisting of a variable number of rings composed at least in part of long rings, with means for transmitting a ringing signal of a selected code over said line, a chain of counting relays sequentially operated and released in response to successive rings in said transmitted code to count the number of rings in said code, relay means operative in the event the transmitted code includes a long ring, and call intercepting means controlled by the last operated counting relay and controlled by the operated condition of said relay means for intercepting predetermined calls routed to said line.

22. In a telephone system including a line and cyclically operated ringing apparatus for transmitting signal pulses of short or long duration over said line during each cycle operation thereof, a chain of counting relays sequentially operated by successive signal pulses during one cycle operation of said apparatus for counting the number of signal pulses during said one cycle, and call intercepting means controlled in accordance with the setting of said counting relays and in accordance with the duration of certain of said pulses for intercepting predetermined calls routed to said line.

23. In a telephone system having a line and a cyclically operated ringing apparatus for transmitting a variable number of call signal ringing pulses over said line, a chain of counting relays successive ones of which are operated in response to the successive signal pulses transmitted over said line during one cycle of operation of said apparatus to count the number of signal pulses during said one cycle, means also operated in response to the signal pulses of said one cycle, and call intercepting apparatus controlled in accordance with the operation of said counting relays and said means to intercept predetermined calls routed to said line.

24. In a telephone system including a line with cyclically operated ringing apparatus for transmitting a variable number of signaling ringing pulses over said line during each cycle of operation thereof, a chain of counting relays sequentially operated by successive signal pulses during one cycle of operation of said apparatus for counting the number of pulses in said one cycle, and call intercepting means operative in response to predetermined settings of said counting relays for intercepting predetermined calls routed to said line.

25. In a telephone system including a line and ringing apparatus for transmitting a variable number of ringing signal pulses over said line, a chain of counting relays sequentially operated and released in response to successive ringing signal pulses for counting the number of signal pulses transmitted to said line, and a call intercepting means controlled by the last operated counting relay for intercepting predetermined calls routed to said line.

ROY W. JONES.

REFERENCES CITED

The following references are of record in the file of this patent:

UNITED STATES PATENTS

| Number | Name | Date |
|---|---|---|
| 1,070,726 | Poole | Aug. 19, 1913 |
| 1,463,271 | Martin | July 31, 1923 |
| 1,889,466 | Crowe | Nov. 29, 1932 |
| 1,969,376 | Leich | Aug. 7, 1934 |
| 2,236,797 | Kudrna | Apr. 1, 1941 |
| 2,285,282 | Jones | June 2, 1942 |
| 2,320,885 | Powell | June 1, 1943 |
| 2,344,634 | Powell | Mar. 21, 1944 |